US007212147B2

(12) United States Patent
Messano

(10) Patent No.: US 7,212,147 B2
(45) Date of Patent: May 1, 2007

(54) METHOD OF AGILE REDUCTION OF RADAR CROSS SECTION USING ELECTROMAGNETIC CHANNELIZATION

(75) Inventor: Al Messano, New City, NY (US)

(73) Assignee: Alan Ross, Norwood, NJ (US)

(*) Notice: Subject to any disclaimer, the term of this patent is extended or adjusted under 35 U.S.C. 154(b) by 120 days.

(21) Appl. No.: 10/895,174

(22) Filed: Jul. 19, 2004

(65) Prior Publication Data

US 2006/0012508 A1 Jan. 19, 2006

(51) Int. Cl.
*H01Q 17/00* (2006.01)
*G01S 13/00* (2006.01)

(52) U.S. Cl. .................... 342/4; 342/1; 342/13; 342/14

(58) Field of Classification Search .............. 342/1–12, 342/13–20, 175
See application file for complete search history.

(56) References Cited

U.S. PATENT DOCUMENTS

| | | | | | |
|---|---|---|---|---|---|
| 2,656,535 | A | * | 10/1953 | Neher | 342/4 |
| 2,822,539 | A | * | 2/1958 | McMillan | 342/1 |
| 2,875,435 | A | * | 2/1959 | McMillan | 342/1 |
| 2,992,425 | A | * | 7/1961 | Pratt | 342/1 |
| 3,007,160 | A | * | 10/1961 | Halpern | |
| 3,152,328 | A | * | 10/1964 | McMillan | 342/1 |
| 3,290,680 | A | * | 12/1966 | Wesch | 342/1 |
| 3,300,781 | A | * | 1/1967 | Clough et al. | 342/3 |
| 3,315,259 | A | * | 4/1967 | Wesch | 342/3 |
| 3,315,260 | A | * | 4/1967 | Wesch | 342/3 |
| 3,349,396 | A | * | 10/1967 | Reed | 342/3 |
| 3,349,397 | A | * | 10/1967 | Rosenthal | 342/3 |
| 3,454,947 | A | * | 7/1969 | Ullrich et al. | 342/1 |
| 3,508,265 | A | * | 4/1970 | Ellis | 342/1 |
| 3,526,896 | A | * | 9/1970 | Wesch | 342/1 |
| 3,568,195 | A | * | 3/1971 | Wesch et al. | 342/1 |
| 3,568,196 | A | * | 3/1971 | Bayrd et al. | 342/4 |
| 3,680,107 | A | * | 7/1972 | Meinke et al. | 342/1 |
| 4,162,496 | A | * | 7/1979 | Downen et al. | 342/1 |
| 4,522,890 | A | * | 6/1985 | Volkers et al. | 342/1 |
| 4,581,284 | A | * | 4/1986 | Eggert et al. | 342/1 |
| 4,688,040 | A | * | 8/1987 | Wedertz et al. | 342/3 |
| 4,716,417 | A | * | 12/1987 | Grumet | 342/2 |
| 5,296,859 | A | * | 3/1994 | Naito et al. | 342/1 |
| 5,537,116 | A | * | 7/1996 | Ishino et al. | 342/1 |
| 5,576,710 | A | * | 11/1996 | Broderick et al. | 342/1 |
| 5,708,435 | A | * | 1/1998 | Kudo et al. | 342/1 |

* cited by examiner

*Primary Examiner*—Bernarr E. Gregory
(74) *Attorney, Agent, or Firm*—Winston & Strawn LLP

(57) ABSTRACT

A method for reducing radar cross section of an object that has conductive portions and that is expected to be scanned by radar, which includes providing the object with a multiple layer radar cross section reducing structure that reduces or entraps or dissipates radar waves therein so that the size or configuration of the object cannot be correctly detected by radar scanning. The invention also relates to the radar cross section reducing structure alone or associated with an object such as a vehicle that transports personnel or equipment. The structure can be provided on an object that previously has no stealth capability or it can be applied to an object that already has stealth capability for increasing its capability to prevent correct detection by radar scanning.

20 Claims, 14 Drawing Sheets

Figure 2

| Layer # | Layer Name | Purpose of Layer | n, Refractive Index | K, Dielectric Constant |
|---|---|---|---|---|
| 1 | Aeroskin | Protective outer skin (fixed) | 1.1 | 1.1 |
| 2 | Trap 1 | Broad band channelization (fixed) | 2.0 | 4.0 |
| 3 | Trap 2 | Broad band channelization (fixed) | 4.0 | 16.0 |
| 4 | Radar Band 1 | Selective band channelization (variable) | 4.5 Approx. | 20.25 |
| 5 | Radar Band 2 | Selective band channelization (variable) | 6.0 Approx. | 36 |
| 6 | IGP 1 | Hi freq. selective IGP (fixed) | 10 | 100 |
| 7 | IGP 2 | Lo freq selective IGP (fixed) | 12 | 144 |
| 8 | Reflector | Reflector (fixed) | 20 | 400 |

METHOD OF AGILE REDUCTION OF RADAR CROSS SECTION USING ELECTROMAGNETIC CHANNELIZATION

TECHNICAL FIELD

This invention relates to technology for providing an active method of reducing Radar Cross Section (RCS) of aircraft and other vehicles being scanned by threat detection radars.

BACKGROUND OF THE INVENTION

Radar, an acronym for "Radio Detection and Ranging", systems was originally developed many years ago but did not turn into a useful technology until World War II.

One component of a basic radar system is typically a transmitter subsystem which sends out pulse of high frequency electromagnetic energy for a short duration. The frequencies are typically in the Gigahertz (GHz) range of billions of cycles per second. When such a pulse encounters a vehicle made of conducting material (such as metal), a portion of the energy from the incoming pulse is reflected back. If this reflected energy is of a sufficient magnitude, it may be detected by the receiver subsystem of the radar. The computer subsystem which controls the radar system knows when the pulse was transmitted and when the reflected pulse is received. This computer is capable of calculating the round-trip time, t, between the transmitted and received pulses of this electromagnetic energy. These pulses travel at roughly the speed of light, c, which is approximately 186,000 miles/sec (299,999 km/sec). This distance, D, to the detected target is:

$$D=ct/2$$

Examples of current radars and their associated operating frequency bands and uses are as follows:

| Band | Lower frequency (GHz) | Upper frequency (GHz) | Nominal wavelength (cm) |
|---|---|---|---|
| Ka | 34 | 38 | 0.8 |
| Ku | 12 | 18 | 2 |
| X | 8 | 12 | 3 |
| C | 4 | 8 | 5 |
| S | 2 | 4 | 10 |
| L | 1 | 2 | 20 |

| Airborne radar function | Frequency band |
|---|---|
| Early warning | UHF and S-band |
| Altimeter | C-band |
| Weather | C and X-band |
| Fighter | X and Ku-band |
| Attack | X and Ku-band |
| Reconnaissance | X and Ku-band |
| Extremely small, short range | Ka-band and MMW band |

The relationship between radar wavelength, λ, and radar frequency, v is:

$$\lambda=c/v$$

The strength, or power, of the reflected signal is described very adequately by the Radar Equation which relates radiated power of the transmitting antenna, the size and gain of the antenna and the distance to the target and the apparent size of the target to the radar at the operating frequency of the radar. This equation is as follows:

$$\overline{P}_r = \frac{P_t G^2 \lambda^2 \sigma}{(4\pi)^3 R^4}$$

where:

Pr is the average received power

Pt is the transmitted power

G is the gain for the radar

λ is the radar's wavelength

σ is the target's apparent size

R is the range from the radar to the target

This apparent size of the target, σ, at a given radar wavelength (or frequency) is referred to as the "Radar Cross Section" or RCS. All other things being equal, it is the RCS that dictates the strength of the reflected electromagnetic pulse from a target at a specified distance from the radar transmitter. From a practical standpoint, the RCS is the sole characteristic of the target which dictates whether the target is detected or not.

The current generation of Stealth technologies relies on five elements used in combination to minimize the size of the RCS of a target:

Radar Absorbent Material (RAM)

Internal Radar-Absorbent Construction (IRAC)

External Low Observable Geometry (ELOG)

Infrared Red (IR) Emissions Control

Specialized Mission Profile

The RAM approach to Stealth incorporates the use of coatings containing iron ferrite material which basically transforms the electric component of the incoming radar wave into a magnetic field. Consequently, the energy of the incoming radar wave is allowed to dissipate. This is an undesirable outcome of the RAM approach.

The IRAC approach creates special structure known as "re-entrant triangles" within the outer skin covering the airframe of the Stealth aircraft. These structures capture energy from the incoming radar wave within spaces that approximate the size of the wavelength of a particular radar frequency. The problem with this approach is that the triangles can only protect against a particular radar frequency, so that multiple triangles are required or the aircraft can be detected by different frequencies.

The ELOG approach is what gives Stealth aircraft the characteristic angular geometry clearly visible to even a lay observer. This flat, angled shape allows incoming radar waves to reflect or "skip" off the external geometry in all directions. Such a geometric design limits the design possibilities for the aircraft.

IR emissions control techniques deal with the heat (IR) signature of vehicular engine output but this requires a different control technique for each different engine signature.

The combination of the above four techniques is highly effective in reducing the RCS of Stealth aircraft in their own right. Additionally, each Stealth mission is carefully laid out so as to present only the minimized RCS to threat detection radars which have been identified and located prior to the mission. Thus a very specific and well-choreographed flight profile incorporating altitude, airspeed, angle-of attack and other flight parameters is flown by Stealthy aircraft on each and every mission. This causes complication of the mission so that improvements are desirable.

In addition, there are short failings with existing Stealth technologies such as the use of toxic chemicals in the construction, susceptibility to the effects of weather and abrasive materials such as sand, as well as continued high levels of maintenance.

But most importantly, there are two major flaws with current Stealth technology. First of all, the techniques outlined above are a permanent fixture of the airframe and cannot be altered or removed without adversely affecting the either the Stealthy or the aerodynamic characteristics of the Stealth aircraft. As such, non-Stealthy aircraft and other vehicles can not be made to take on Stealthy characteristics once they are constructed, commissioned and deployed.

Secondly, Stealth technologies currently in use cannot alter, adjust, adapt or modulate the RCS of a particular Stealthy design in response to new, different or varying radar frequencies employed by an adversary. As such, current Stealth techniques are static, not dynamic, once deployed.

This invention seeks to remedy these shortcomings.

SUMMARY OF THE INVENTION

The invention relates to a method of reducing radar cross section of an object that has conductive portions and that is expected to be scanned by radar. The method comprises providing the object with a multiple layer radar cross section reducing structure that entraps or dissipates radar waves therein so that the size or configuration of the object cannot be correctly detected by radar scanning. The structure can be provided on an object, such as a vehicle that transports personnel or equipment, that previously has no stealth capability or it can be applied to an object that already has stealth capability for increasing its capability to prevent correct detection by radar scanning.

The layers typically comprise one or more fixed dielectric layers or providing broadband radiation channelization; one or more variable dielectric layers for providing selective broadband radiation absorption; or one or more layers each comprising an interference generating pattern ("IGP") for deflecting certain wavelengths of electromagnetic radiation. Preferably, the structure includes a combination of at least two fixed dielectric layers or providing broadband radiation channelization; at least two variable dielectric layers for providing selective broadband radiation absorption; at least two layers each comprising an IGP for deflecting certain wavelengths of electromagnetic radiation; a layer comprising a reflector for reflecting certain wavelengths of electromagnetic radiation; or 2, 3, or all of the previously mentioned layers.

The method can include altering properties of one or more of the dielectric layers to shield against different wavelengths of radar. This provides protection against varying wavelengths of electromagnetic waves used for such radar scanning. That function can instead be achieved by providing one or more additional dielectric layers to shield against different wavelengths of radar.

Generally, the conductive portions of the object are made of metal or metallic materials and the dielectric or interference generating pattern layers are made of a non-conductive material. If desired, the structure can include a layer comprising a reflector for reflecting certain wavelengths of electromagnetic radiation. The method can also include focusing, dissipating and redirecting certain wavelengths of electromagnetic radiation by an output antenna system that is coupled to the combination of layers.

The invention also relates to a radar cross section reducing structure of the types described herein that reduces or entraps and dissipates radar waves therein. The structure can include means for altering properties of one or more of the dielectric layers to shield against different wavelengths of radar.

The invention also relates to a combination of an object that has conductive portions and one of the radar cross section reducing structures disclosed herein. Preferably, the object is an aircraft or other vehicle, and the structure is a coating applied to an exterior portion of the aircraft or other vehicle.

BRIEF DESCRIPTION OF THE DRAWINGS

Preferred embodiments of the invention are disclosed in the following drawing figures, wherein:

FIG. 2 describes the functions and properties of each layer in the Layer Cake structure;

DETAILED DESCRIPTION OF THE PREFERRED EMBODIMENTS

Figure 1:
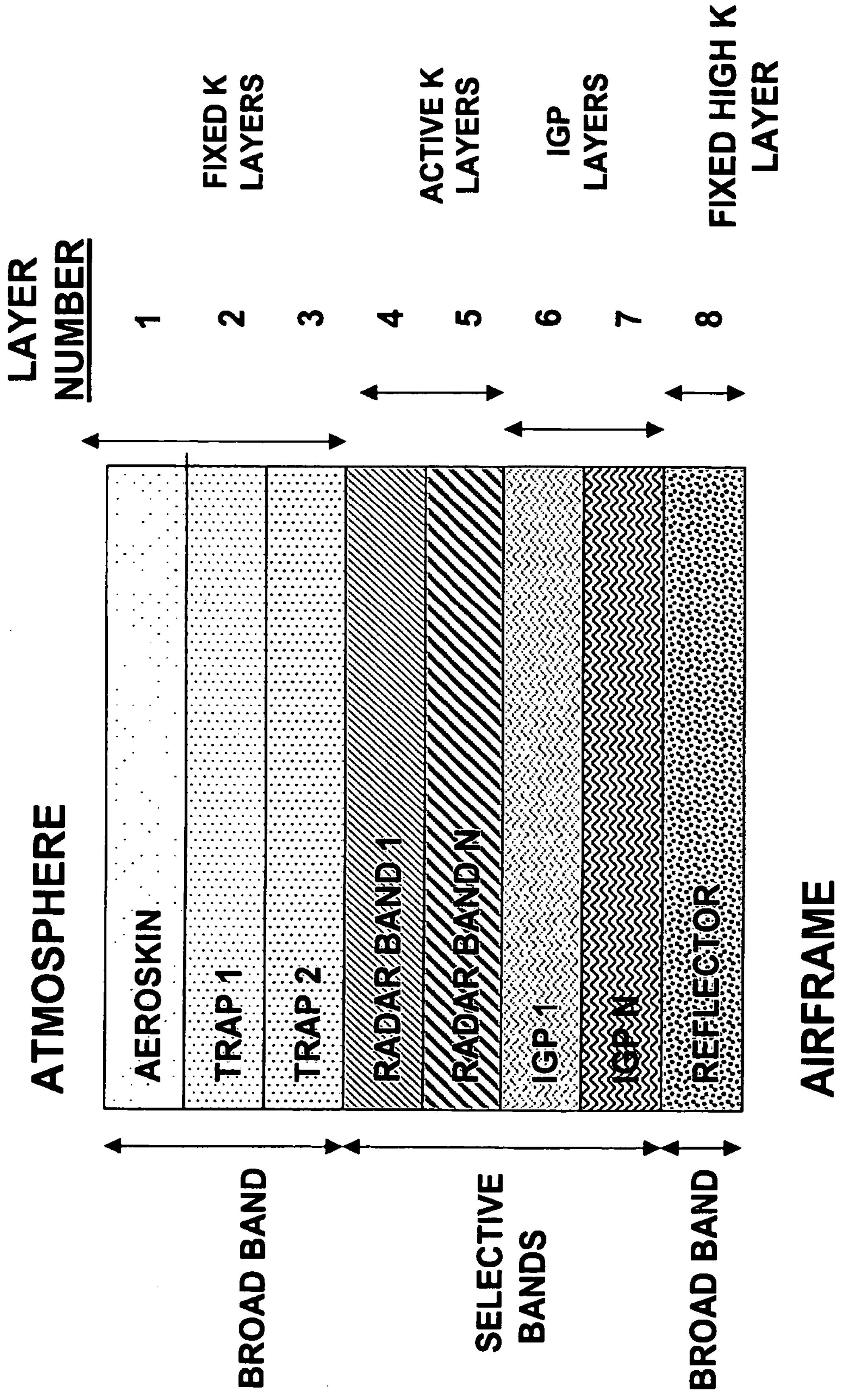
FIG. 1 is a schematic diagram of a typical Stealth "Layer Cake" comprised of active and passive dielectric materials.
Figure 3A:
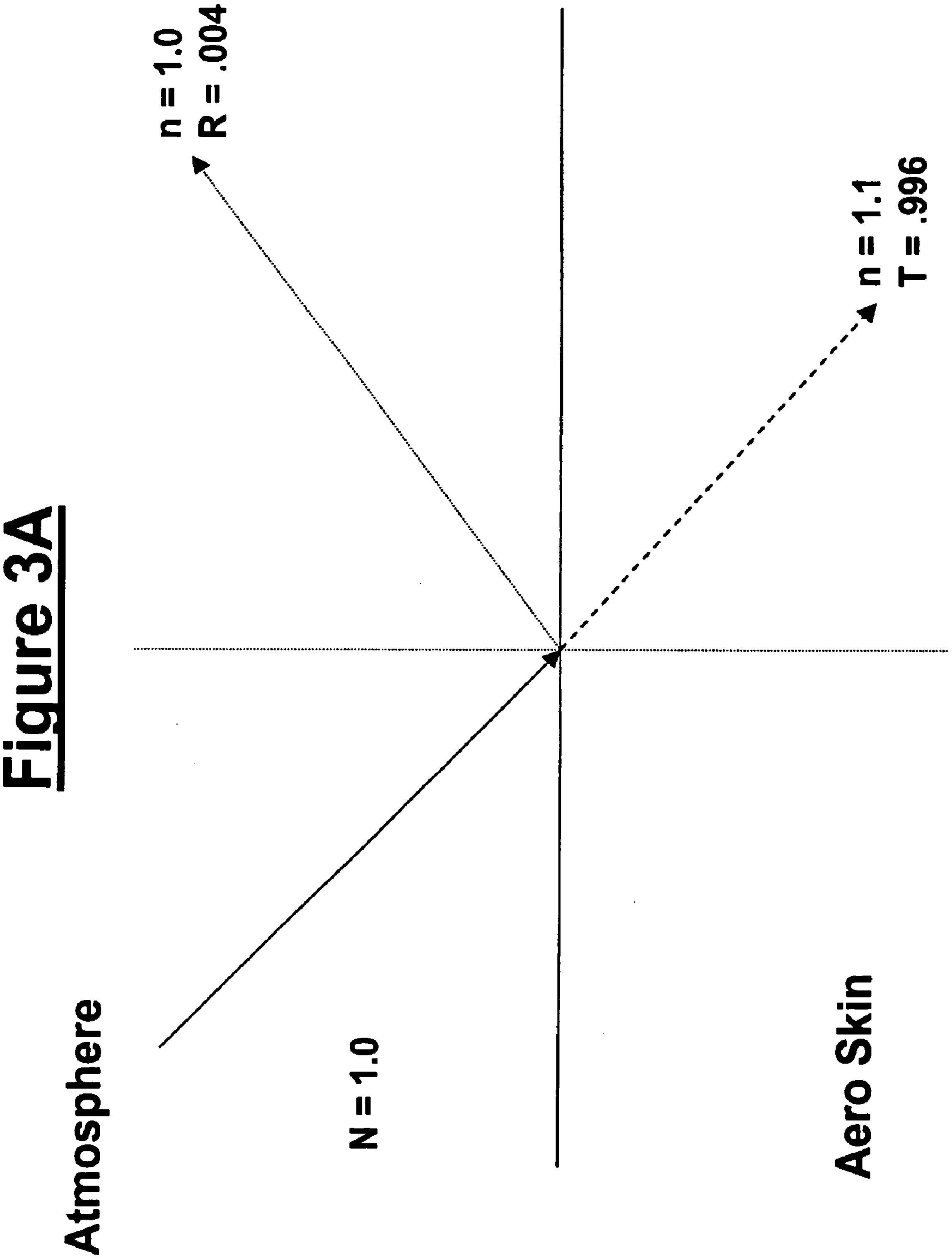
FIG. 3A thru 3J illustrate the transmitted and refracted wave components for each layer of the Layer Cake.
Figure 3B:
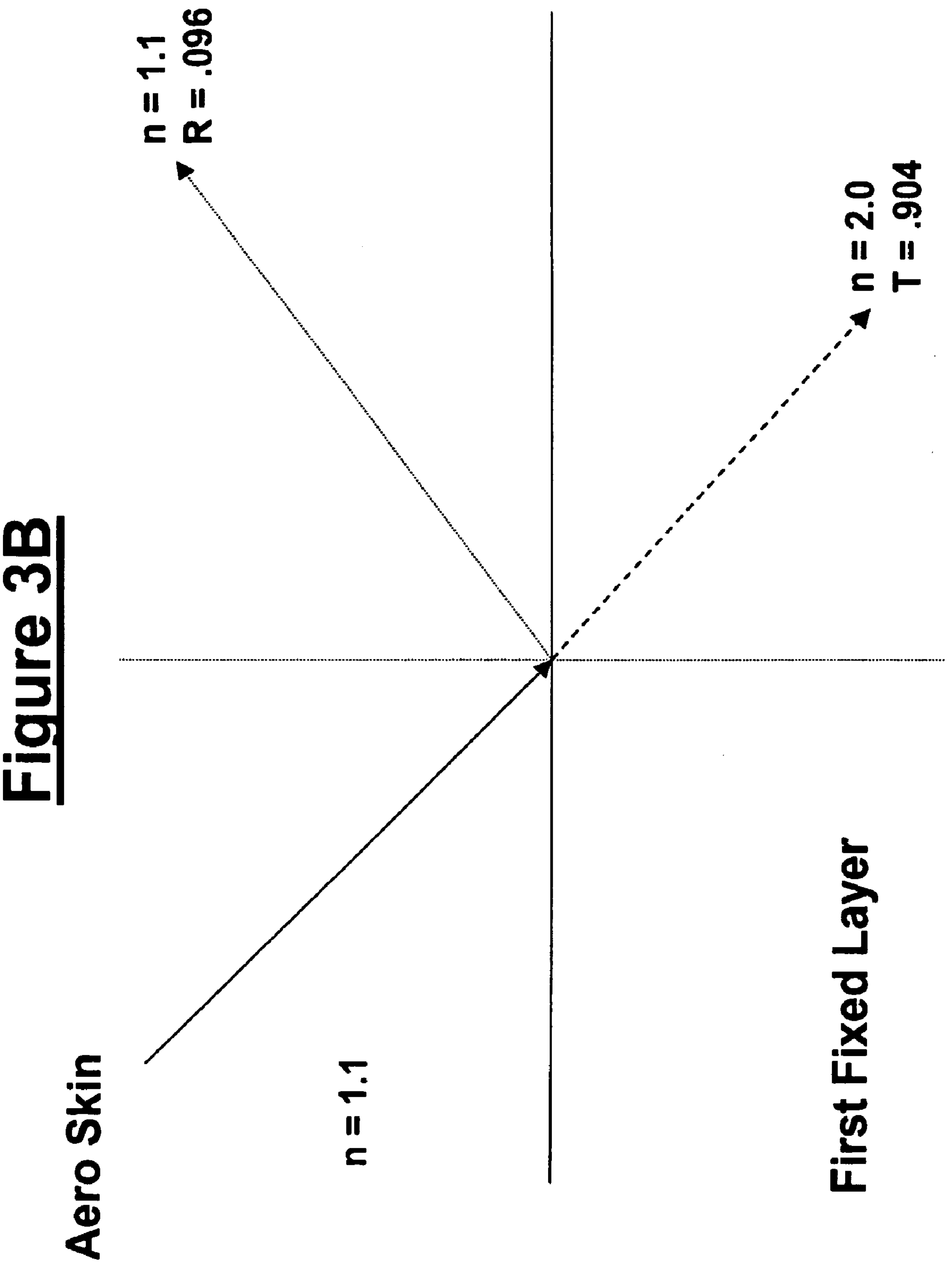
Figure 3C:
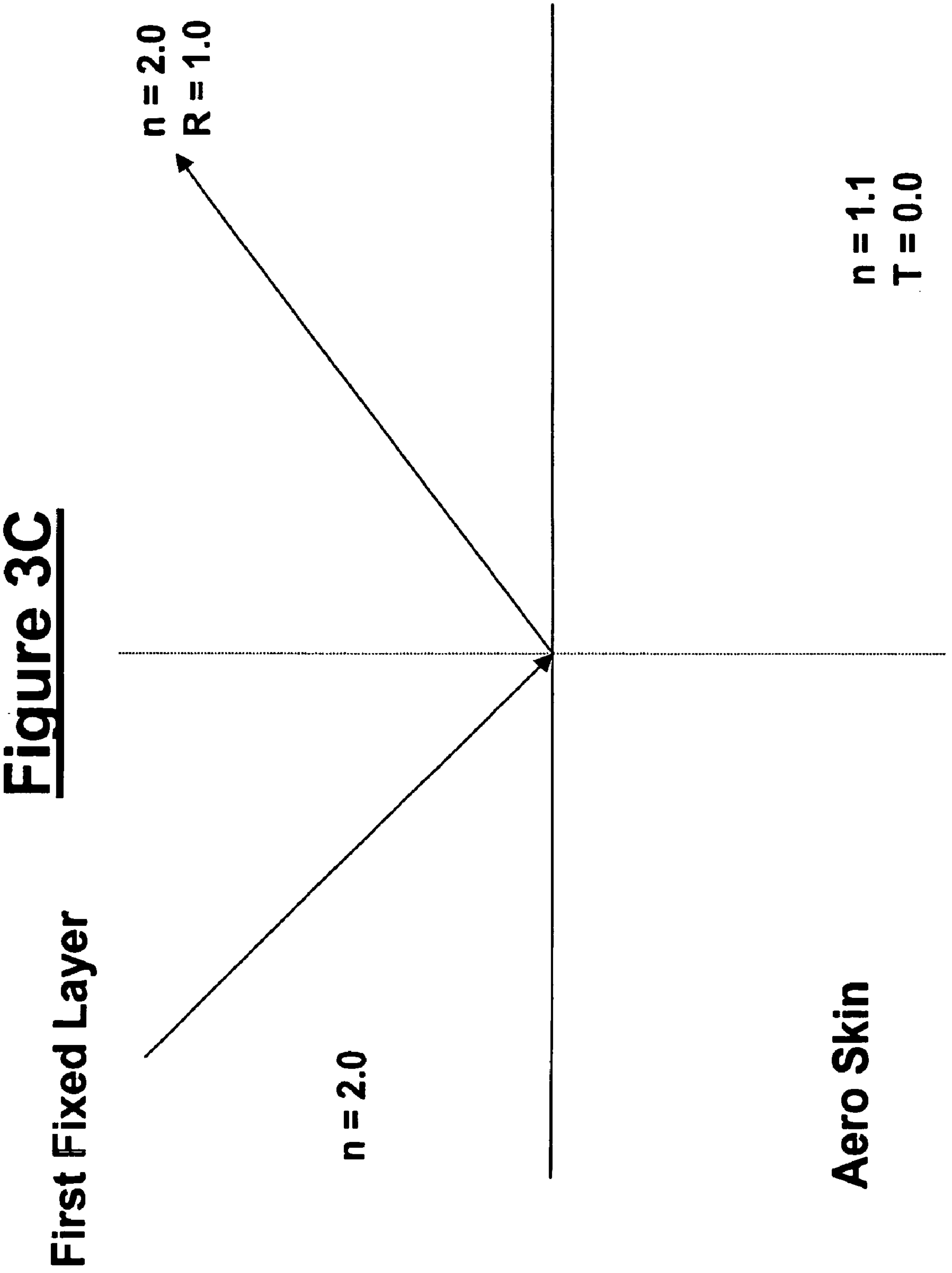
Figure 3D:
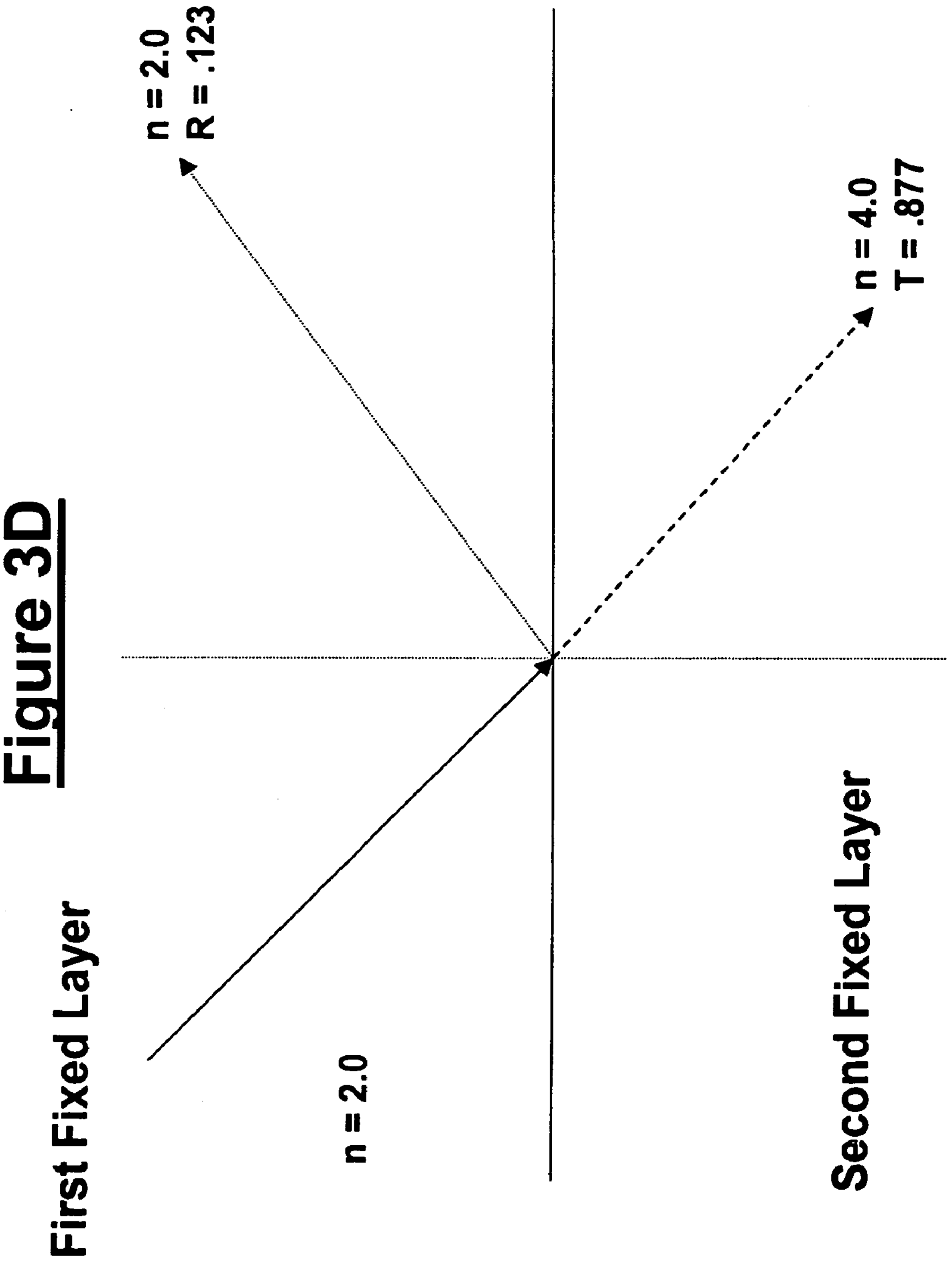
Figure 3E:
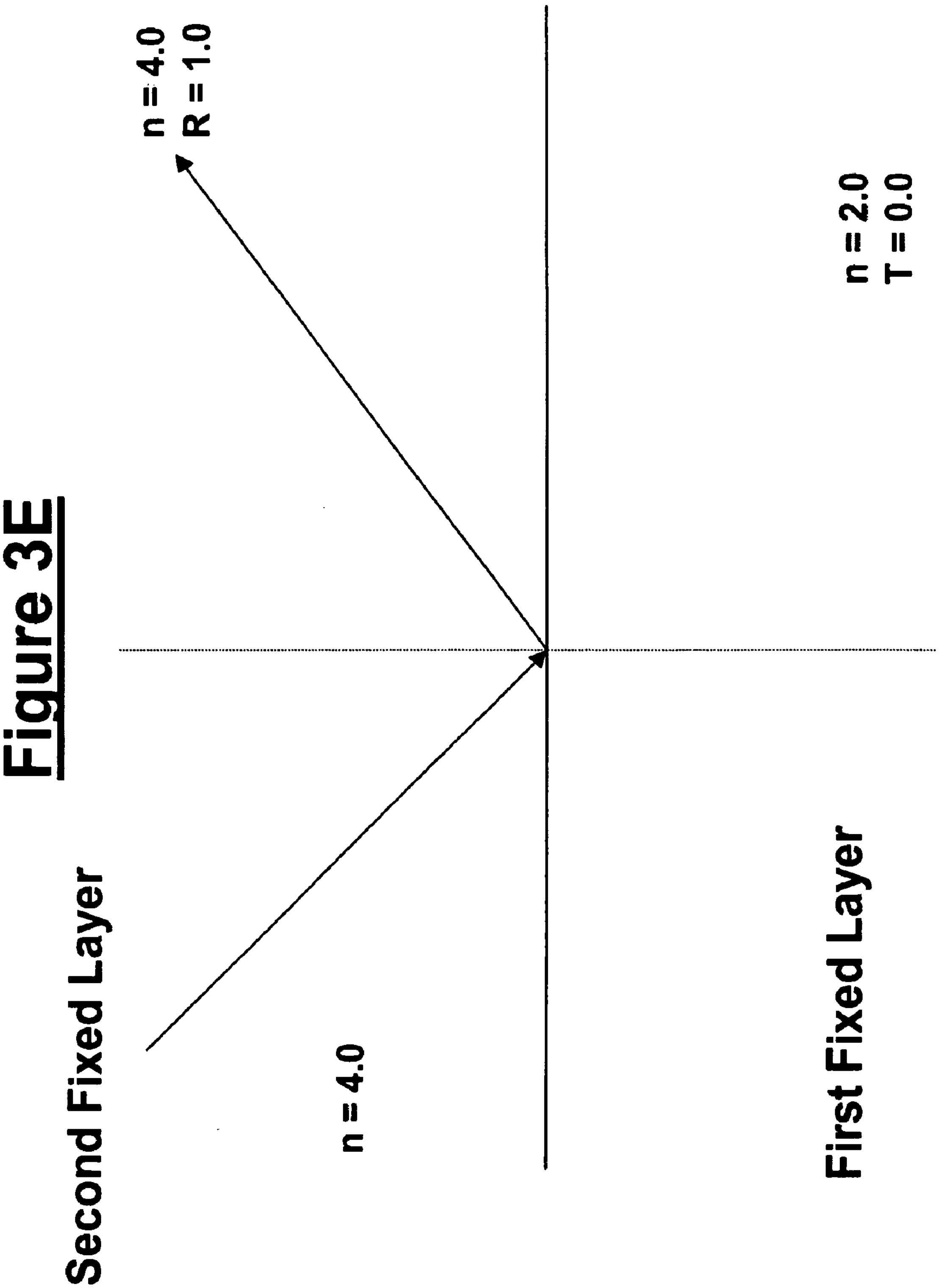
Figure 3F:
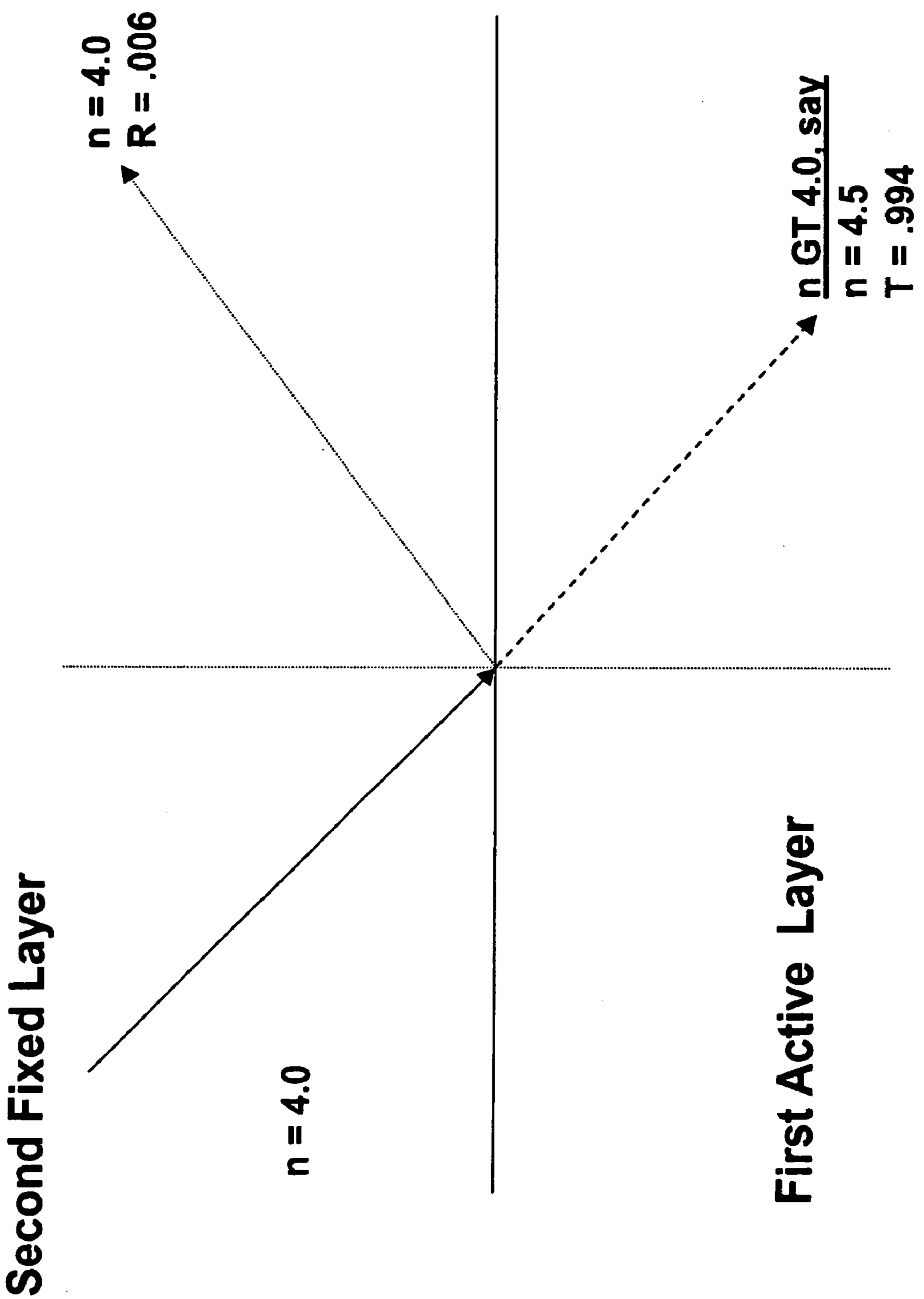
Figure 3G:
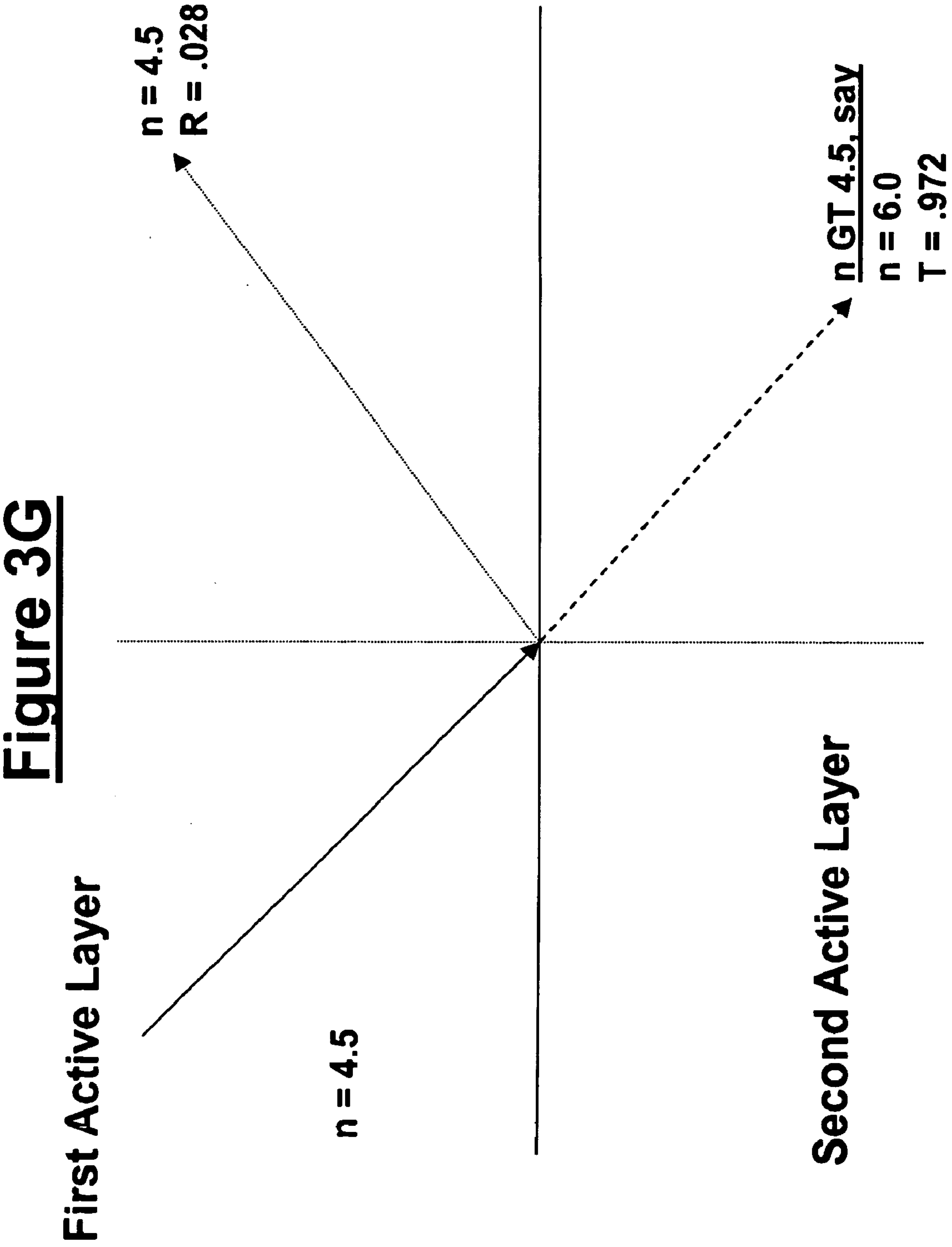
Figure 3H:
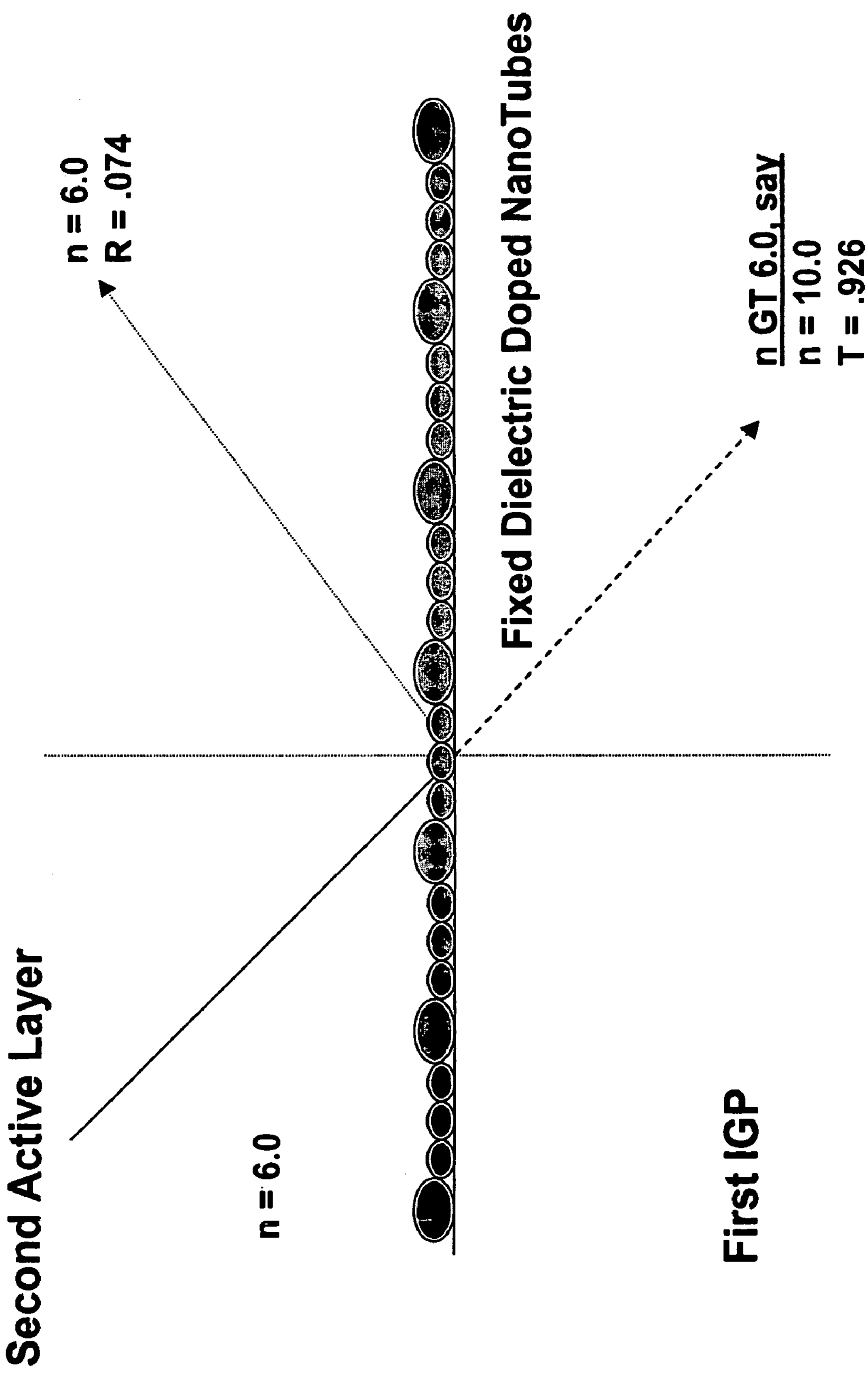
Figure 3I:
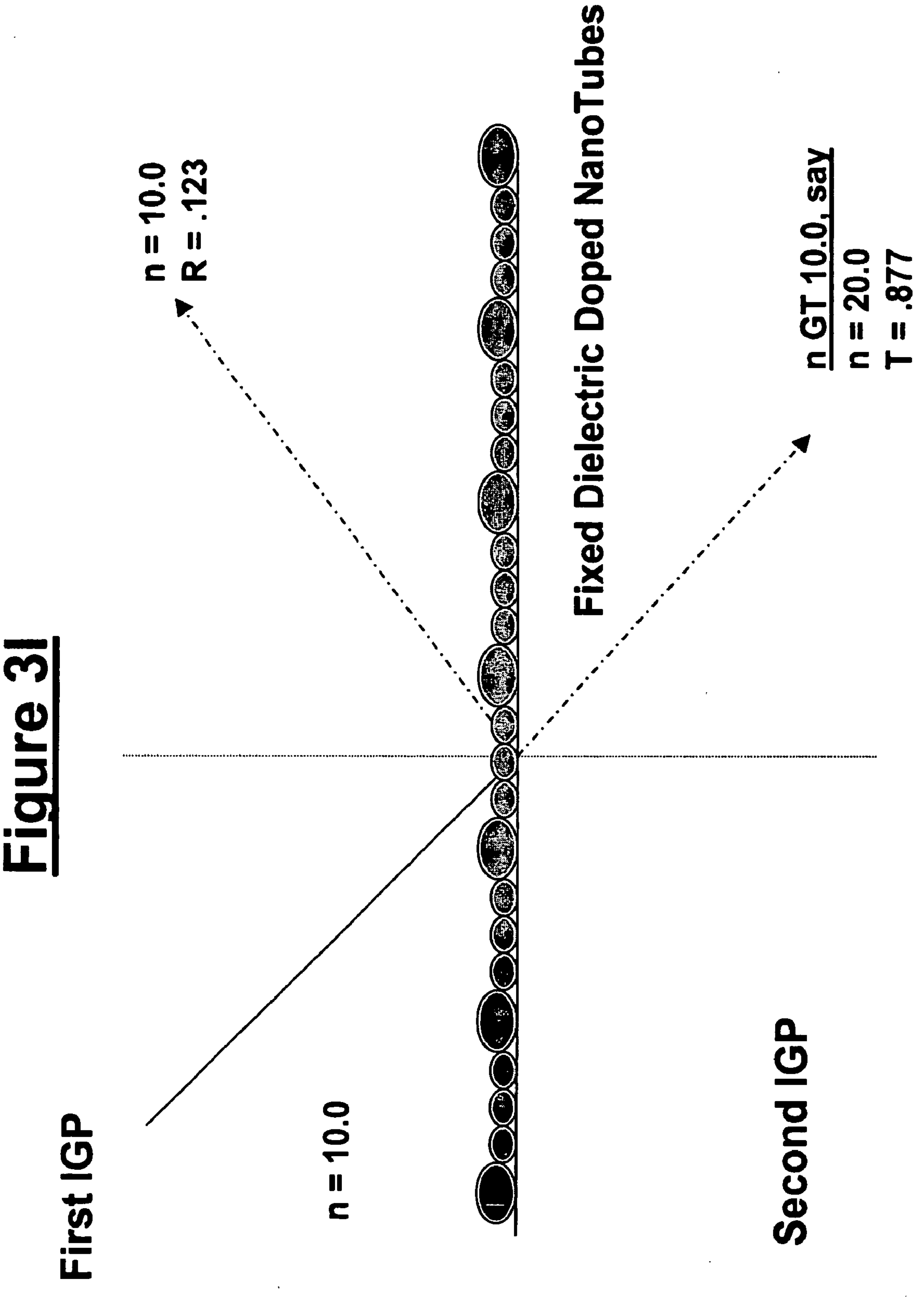
Figure 3J:
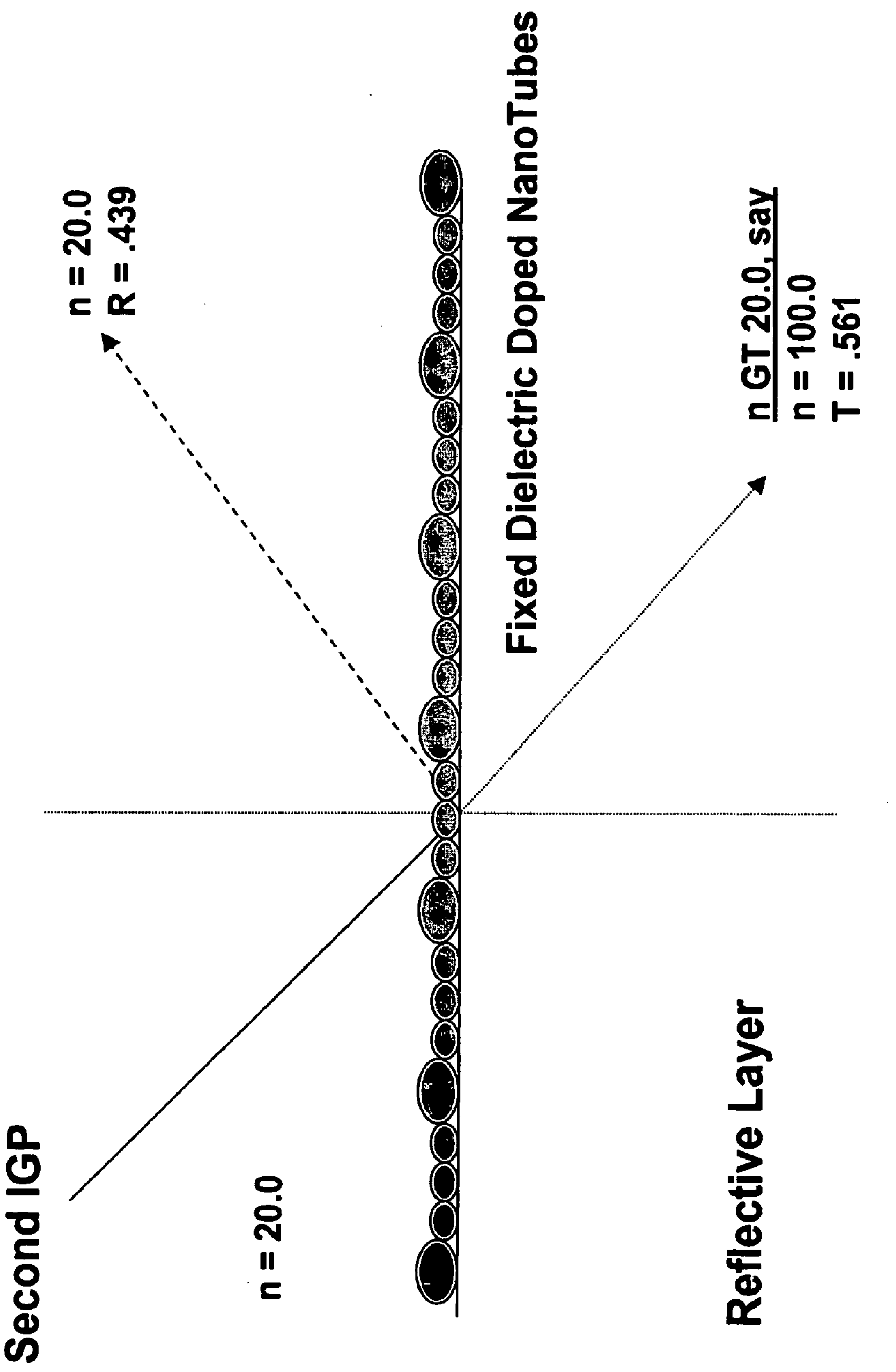

This invention, known as Method of Agile Reduction of Radar Cross Section Using Electromagnetic Channelization (MARRCS), relates to technology for providing an active method of reducing Radar Cross Section (RCS) of aircraft or other vehicle being scanned by threat detection radars. This technology will be both portable and scalable to accommodate a variety of aircraft, or other vehicles, not equipped with existing "Stealth" technology. It may also to provide dynamic and agile stealth capabilities to aircraft currently deployed with only the existing static Stealth technology. It is intended to use nanotechnology, where appropriate, reduce weight, provide support and insure airframe conformity. This technology will not adversely affect the aerodynamic characteristics of the aircraft.

Furthermore, the technology will be active in that it will provide optimum protection from radars operating at different or varying frequencies. The net result will be an agile radar "sponge" which will selectively absorb the transmitted energy of radar signals. By doing so, the returned radar will not be accurate so that the scanner appears to be viewing a different object. It is desired to absorb as much of the radar waves as possible so that the object is not viewed at all. It is also possible according to the invention to redirect the absorbed energy and directionally repropagate it away from the aircraft, possibly for decoy purposes.

This invention relates to technology for providing an active method of reducing the RCS of aircraft being scanned by threat detection radars.

Contrary to existing Stealth methods, this innovative technology is designed not to reflect incoming radar but to capture as much of the incoming electromagnetic energy as possible. Thus it creates a radar "sponge" for this energy which is then channeled and directed away from the aircraft. Essentially, it behaves as a radar energy waveguide.

The technology is designed to operate in all radar bands, as in the above chart, from L through Ka bands. This encompasses frequencies from 2 GHz through 38 GHz. However, since threat detection radars operate in the X, Ku and Ka bands, these frequencies will be discussed in greater detail than the others. The technology is adaptable to the higher frequency Q, V and W bands as well.

Channelization of the incoming electromagnetic waves in the above radar frequencies is accomplished through the use of a vertical and horizontal multiple-layer structure referred to as a Layer Cake herein. The materials utilized in this structure are generally active and passive dielectrics. Passive dielectrics are those which retain a fixed dielectric constant, K, for all frequency ranges concerned. Active dielectrics are those whose dielectric constant, K, may be changed by electrical, mechanical or electronic methods over the frequency ranges concerned.

The magnitude of the dielectric constant, K, is related to the magnitude of the index of refraction, n, as follows:

$$K=n^2$$

It is the value of n of each layer which determines the amount of energy refracting into the next lower layer of dielectric and reflected into the above layer.

A typical Stealth Layer Cake is depicted in FIG. 1. Each layer in such a Layer Cake has a specific function. These functions are outlined in FIG. 2. The outermost layer (also referred to as Layer 1) is composed of a layer of dielectric material referred to herein as an Aeroskin. The refractive index of this layer should be close to that of atmospheric air whose n=1 so that a preferred Aeroskin index would be n=1.1. Selection of this index of refraction, greater than that of air, will allow most of the radar wave to "bend" or refract into the Aeroskin. A small amount of energy would then be reflected off the Aeroskin. Suitable materials for the Aeroskin include low drag dielectric plastic or rubber materials with those made of fluorinated polymers such as Teflon being preferred.

The next layers (FIG. 1 depicts two such layers) are comprised of fixed dielectric constant, therefore index of refraction, materials of successively increasing values. The attached FIGS. 3-A thru 3-J show values of n as well as the percentage of energy transmitted through an interface between layers or reflected off that interface.

FIG. 1 depicts an n=2 for the first fixed layer (Layer 2 called Trap 1). The dielectric for the next fixed layer (Layer 3 referred to as Trap 2) so the index is n=4. These increasing values of n will continue to allow the incoming wave to bend or refract deeper into the structure. The majority of the energy is again transmitted through the layers, although there will be some radar energy reflected off each succeeding surface of layered material. However, this reflected energy will be prevented from leaving the structure as it encounters a higher layer of lower dielectric which bends it back into the structure. Channelization will continue to be reinforced as the radar wave is refracted further into the structure. The structure of the Layer Cake may comprise more than two layers of fixed dielectric.

The next layers in the structure (FIG. 1 depicts two such layers) are comprised of active layers of variable dielectric material. In FIG. 1, these layers (designated layers 4 and 5) Radar Band 1 and Radar Band 2. Materials utilized in these layers are composed of dielectrics which capable of altering their values of dielectric constant through electrical and electronic means. Consequently, these layers act as filters which selectively refract radar waves of specific frequencies deeper into the Layer Cake. There may be more than two layers of active dielectric, although FIG. 1 depicts only two. These layers have succeeding higher dielectric constants, yielding indices of refraction of approximately 4.5 and 6, respectively. Channelization continues to be reinforced as electromagnetic waves are refracted deeper into the Layer Cake.

The next layers (FIG. 1 depicts two such layers numbered 6 and 7) are comprised of carbon nanotubes (CNT) shaped into a specific Interference Generating (IGP). Such IGPS and their design and function are disclosed in U.S. patent application Ser. No. 09/706,699 filed Nov. 7, 2000, now U.S. Pat. No. 6,785,512, and U.S. Ser. No. 10/846,975 filed May 14, 2004, the entire content of each of which is expressly incorporated herein by reference thereto. These CNT's are "doped" with dielectric materials thus creating doped CNT's or DCNT's.

The IGP is generally one that may be nonconductive and is or includes a pattern, such as a grating, cone, sphere or polygon, of an inorganic material. Preferably, the IGP is provided as a support member configured in the appropriate pattern and includes a coating of a non-conductive material having a high dielectric constant thereon. The dielectric materials include families of materials of high dielectric constant, K, ranging from values of 2 to more than 100, and including compounds of silicon and of carbon, refractory materials, rare earth materials, or semiconductor materials. The coating is applied at a generally uniform thickness upon the pattern configured as a support member.

The IGP described herein is advantageously configured to attenuate radio frequency radiation in the appropriate radar range of 2 to 38 GHZ. Advantageously, interference generating pattern reduces the radio frequency signal by at least 20 dB. The numbers of IGP layer depends on the number of radar frequency bands of concern. While only two such layers as depicted in FIG. 1, more IGP layers may be added to included channelization for additional radar frequencies.

The method can include superimposing a plurality of support members to provide IGPs that attenuate the entire range of radio frequency radiation. Alternatively, the support member can be comprised of different IGPs so as to substantially attenuate the entire range of radio frequency radiation. The pattern of the support member can be provided in the form of a grating, cone, sphere or polygon. Also, the IGP may be comprised of different patterns constructed with different physical dimensions for each pattern depending on the radar frequency of concern. For example, the IGP may be comprised of vertical layering of the different multiple patterns, or of horizontal layering of the different multiple patterns. Also, the IGP may be comprised of vertical or horizontal layering of the different multiple patterns which are axially offset from each other. The IGP layer will permit a tuned antenna to be created, thereby retransmitting the incident waves back into the Layer Cake.

The last layer, identified as layer 8 in FIG. 1, is a reflective layer composed of fixed high dielectric material or a conductive or metallic backplane. This implies that the index of refraction will be high. FIG. 1 depicts a Layer Cake with an n=20. Thus essentially all incident waves, which have passed through previously higher layers in the Layer Cake will be reflected back into previous layers. Because the index of refraction of these layers is less, these waves will be trapped within the structure.

Figure 4:
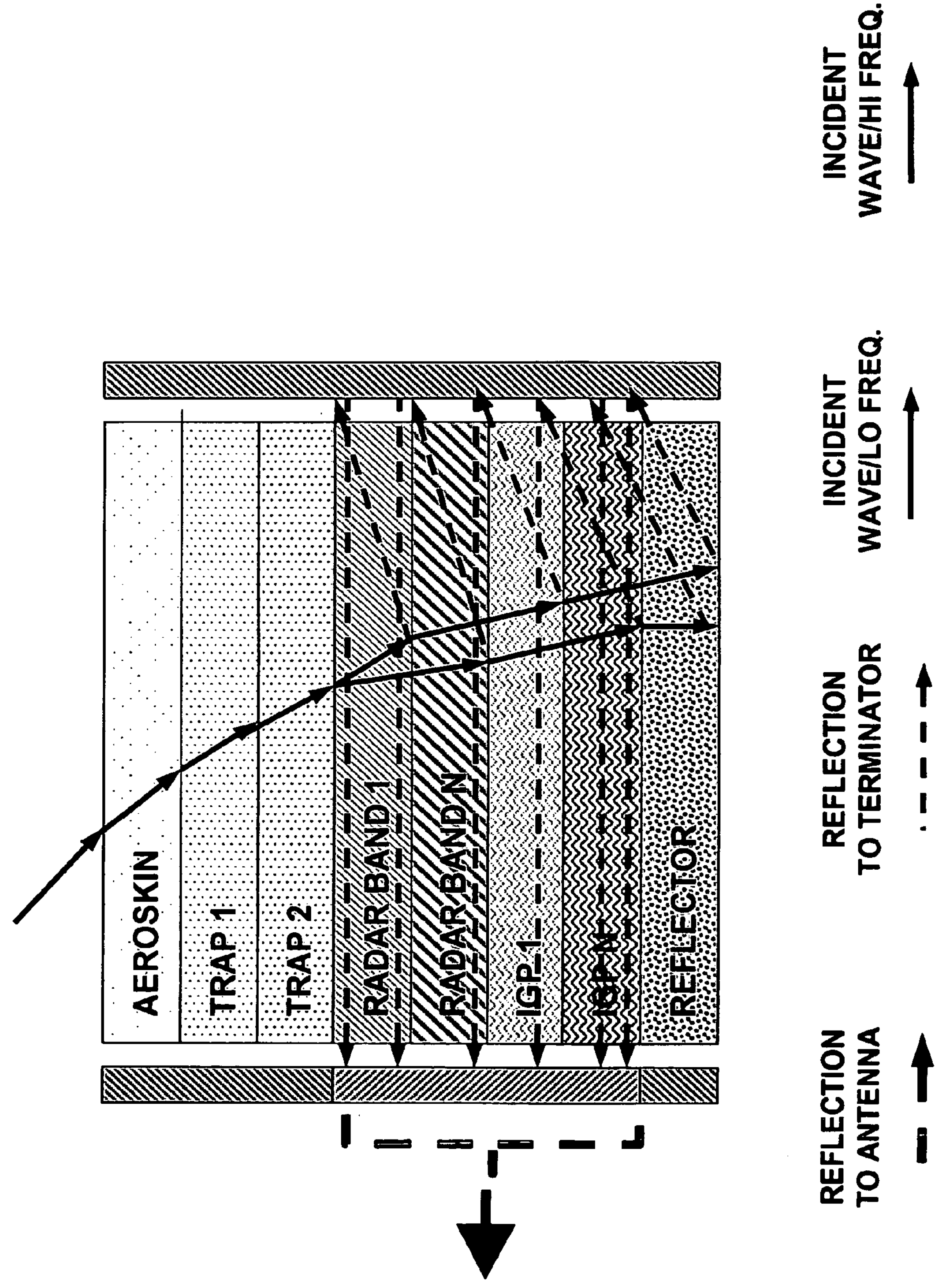
FIG. 4 illustrates the net wave channelization and redirection effect.

The arrangement of dielectric materials within the Layer Cake enables incident radar waves to become trapped within the structure. Once trapped, they cannot escape and may be channelized towards an appropriate outlet. The outlet is created by allowing the structure to terminate at one end by a broad band conductive termination. By broad band, it is meant that all the radar frequencies concerned (for example X, Ka and Ku) would be reflected equally back through the structure and then from the outlet. At the other end of the structure is a termination which is matched to the radar bands selected. This termination is then coupled to an antenna. The intent is to contain as much of the radar energy within the active Radar Band layers (layers 4 and 5) and the IGP layers (layers 6 and 7) since these layers are more selective than the succeeding layers (Layers 1, 2 and 3). FIG. 4 depicts the net Channelization of the Layer Cake.

The antenna may be a conventional microwave antenna with good gain characteristics across the entire range of radar frequencies in question. It also would be possible to include a provision for coherent microwave output emissions, as in a maser. The antenna may be mechanically or electrically steerable and may use Micro Mechanical/Electrical Systems (MEMS) technology to alter the focal length of the antenna. This allows the absorbed waves to be dissipated away from the vehicle in a controlled manner to prevent correct detection of the size or configuration of the vehicle by radar scanning.

The goal is for the RCS structure to capture as much incident radar energy as possible by virtue of the layers, and channelize it within the successive layers of the Layer Cake. By creating a radar "sponge", reflection from the structure would be minimized, thus reducing the RCS. By projecting the radar energy from the outlet and away from the aircraft, any increase in thermal signature would be minimized. Furthermore creation of a radar decoy is also possible. Proper gain control of the antenna subsystem could be employed to create MASER-like output.

A major consideration of this invention is to not detrimentally affect the aerodynamic characteristics of the aircraft. Consequently, the Layer Cake structure must be thin and light, and also have a low dynamic factor of friction. The use of nanotube technology has been cited in the construction of the IGP layers (layers 6 and 7 in FIG. 1). However, nanotubes doped with dielectric material of either the active or fixed kind, may be utilized in some or all other layers.

It is intended that this Layer Cake structure be constructed in different physical dimensions. Thus, these structures may be engineered as to be mounted on existing non-Stealthy aircraft. This would provide a certain level of active Stealth capability. Similarly, these structures may be mounted on existing Stealthy aircraft utilizing fixed Stealth capabilities in order to provide them with an active Stealth capability which they currently do not possess.

Figure 5:
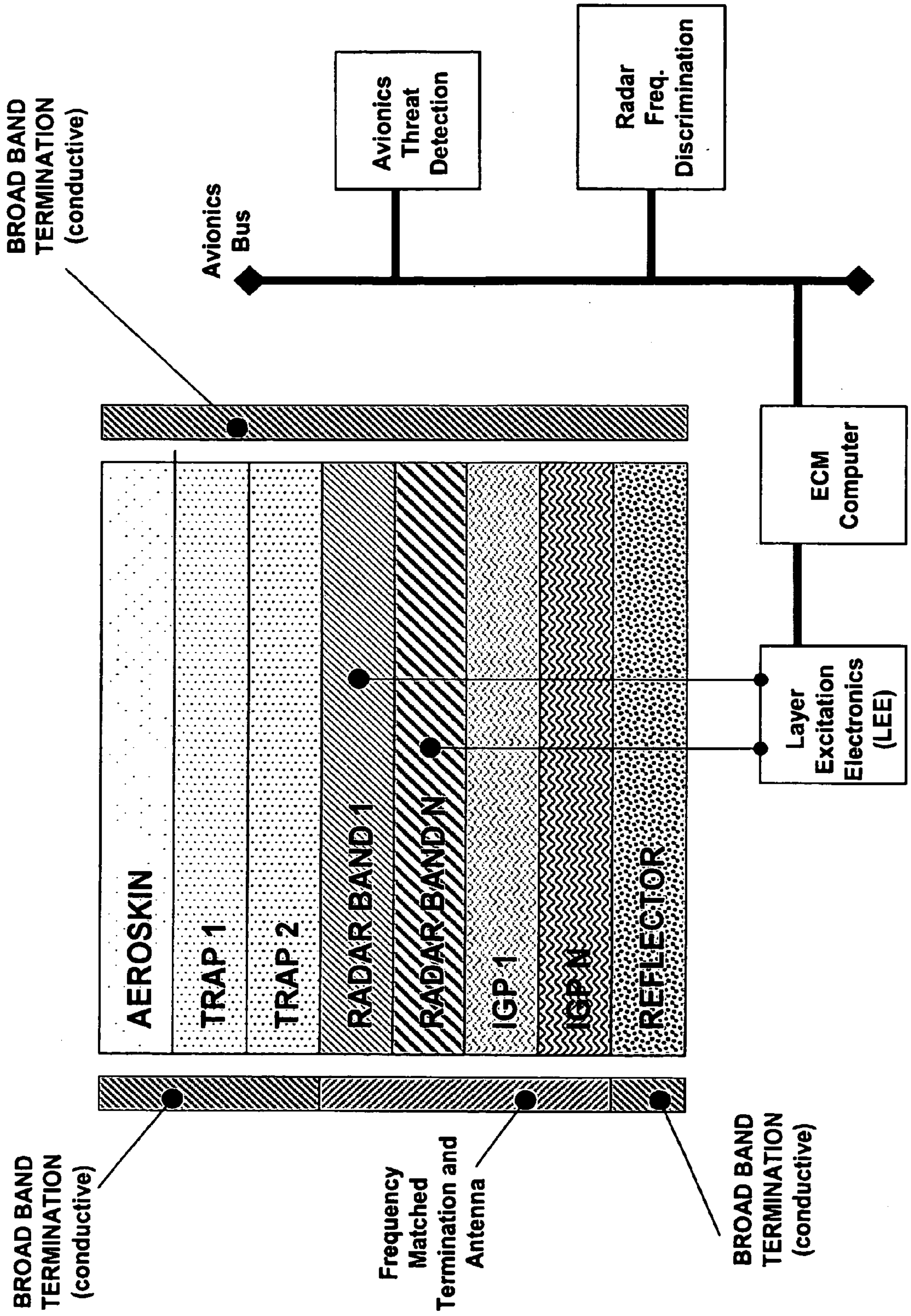
FIG. 5 illustrates the computer interface and its operative association with the Layer Cake.

It is also intended that the Layer Cake structure offer an agile radar defense. As stated previously, layers 4 and 5 would be active in that they would provide variation of index of refraction according to selected radar frequency. FIG. 5 depicts how this would work. Existing radar systems are able to determine which frequencies are scanning the aircraft. Typically the radar system puts that data on the aircraft's avionics bus (PCI, MII or other bus types) in a manner as to provide an alert to the pilot and/or REO. Currently, this threat detection warning is typically in the form of an "idiot light" that illuminates upon detection of the radar waves. However, the frequency data on the bus could be transmitted as well to a simple defense industry compliant single board computer (SBC) in an avionics bay of the aircraft. This SBC is referred to as the Electromagnetic CounterMeasure (ECM) computer in FIG. 5. The ECM would drive the Layer Excitation Electronics (LEE) necessary to alter the dielectric constant of the active layers in the Layer Cake. The ECM power requirements should be on the order of a few tens of watts. Solid state materials (i.e., InGaAs, etc.) that are known to be capable of changing their dielectric constant can be used for this purpose.

Consequently, this MARRCS invention would result in a radar-frequency agile threat intervention system. Existing avionics would detect radar scans and discriminate those scanned frequencies. The existing avionics bus would pass this data on to the ECM computer in real-time. The ECM computer, in turn would drive the LEE into real-time arrive layer response. Thus, radar energies of various frequencies would be captured, channelized and dissipated by the antenna in a controlled manner.

The RCS structure can be applied to all of the object or at least to significant portions of the object. On an aircraft, for example, the structure would at least be applied to the lower half of the fuselage and to the bottom of the wings to shield against ground radar. Of course, the entire outer portions of the aircraft body and wings can receive the structure as a coating or flexible "skin" that confirms and is adhered to the vehicle.

What is claimed is:

1. A method for reducing radar cross section of an object that has conductive portions and that is subject to being scanned by radar waves, which comprises providing the object with a multiple layer structure that includes at least two layers, one of which is a dielectric layer having fixed dielectric properties for providing broadband radiation channelization; and a second of which is a dielectric layer having variable dielectric properties for providing selective broadband radiation absorption, wherein the structure entraps and dissipates radar waves therein in an amount sufficient so that the size or configuration of the object cannot be correctly detected by radar scanning.

2. The method of claim 1 wherein the structure includes:
- one or more additional dielectric layers having fixed dielectric properties for providing broadband radiation channelization;
- one or more additional dielectric layers having variable dielectric properties for providing selective broadband radiation absorption; and
- one or more layers each comprising an interference generating pattern for deflecting certain wavelengths of electromagnetic radiation.

3. The method of claim 1 which further comprises altering properties of one or more of the dielectric layers to shield against different wavelengths of radar.

4. The method of claim 1 which further comprises providing one or more additional dielectric layers to shield against different wavelengths of radar.

5. The method of claim 1 wherein the multiple layer structure further comprises an interference generating pattern for deflecting certain wavelengths of electromagnetic radiation, and wherein the conductive portions of the object are made of metal or metallic materials and the dielectric or interference generating pattern layers are made of a non-conductive material.

6. The method of claim 1 wherein the structure includes a layer comprising a reflector for reflecting certain wavelengths of electromagnetic radiation.

7. The method of claim 1 wherein the structure includes:
- at least two dielectric layers having fixed dielectric properties for providing broadband radiation channelization;
- at least two dielectric layers having variable dielectric properties for providing selective broadband radiation absorption;

at least two layers each comprising an interference generating pattern for deflecting certain wavelengths of electromagnetic radiation; and a layer comprising a reflector for reflecting certain wavelengths of electromagnetic radiation.

8. The method of claim 7 which further comprises focusing, dissipating and redirecting certain wavelengths of electromagnetic radiation by an output antenna system that is coupled to the combination of layers.

9. The method of claim 1 which further comprises applying the structure to a vehicle to provide radar camouflage capability to the vehicle.

10. The method of claim 1 which further comprises applying the structure to a vehicle that already has radar camouflage capability to increase such capability.

11. A combination of a vehicle that transports personnel or equipment, that has conductive portions and that is subject to being scanned by radar waves, and a radar cross section reducing structure comprising a plurality of layers that entraps and dissipates radar waves therein in an amount sufficient so that the size or configuration of the vehicle cannot be correctly detected by radar scanning, wherein the layers of the radar cross section reducing structure comprise:

at least one dielectric layer having fixed dielectric properties for providing broadband radiation channelization; and at least one dielectric layer having variable dielectric properties for providing selective broadband radiation absorption; and wherein the structure entraps and dissipates radar waves therein in an amount sufficient so that the size or configuration of the vehicle cannot be correctly detected by radar scanning.

12. The combination of claim 11 which further comprises means for altering properties of one or more of the dielectric layers to shield against different wavelengths of radar.

13. The combination of claim 11 wherein the dielectric or interference generating pattern layers are made of a non-conductive material.

14. The combination of claim 11 which further includes a layer comprising a reflector for reflecting certain wavelengths of electromagnetic radiation.

15. The combination of claim 11 wherein the structure includes:

at least one or more dielectric layers having fixed dielectric properties for providing broadband radiation channelization; and at least one or more dielectric layers having variable dielectric properties for providing selective broadband radiation absorption;

at least two layers each comprising an interference generating pattern for deflecting certain wavelengths of electromagnetic radiation; and a layer comprising a reflector for reflecting certain wavelengths of electromagnetic radiation.

16. The combination of claim 11, wherein the vehicle is an aircraft and the structure is a coating applied to an exterior portion of the aircraft.

17. The combination of claim 11 further comprising one or more layers each comprising an interference generating pattern for deflecting certain wavelengths of electromagnetic radiation.

18. A combination of a vehicle that transports personnel or equipment, that has conductive portions and that is subject to being scanned by radar waves, and a radar cross section reducing structure comprising a plurality of layers that includes at least two layers, one of which is a dielectric layer having fixed dielectric properties for providing broadband radiation channelization and another of which is a dielectric layer having variable dielectric properties for providing selective broadband radiation absorption, wherein the structure entraps and dissipates radar waves therein in an amount sufficient so that the size or configuration of the vehicle cannot be correctly detected by radar scanning, and an antenna system for focusing, dissipating and redirecting certain wavelengths of electromagnetic radiation.

19. The combination of claim 18, wherein the vehicle is an aircraft and the structure is a coating applied to an exterior portion of the aircraft.

20. The combination of claim 18 wherein the structure includes:

one or more additional dielectric layers having fixed dielectric properties for providing broadband radiation channelization;

one or more additional dielectric layers having variable dielectric properties for providing selective broadband radiation absorption;

at least two layers each comprising an interference generating pattern for deflecting certain wavelengths of electromagnetic radiation; and a layer comprising a reflector for reflecting certain wavelengths of electromagnetic radiation.

* * * * *